US012397499B2

(12) United States Patent
Lo et al.

(10) Patent No.: US 12,397,499 B2
(45) Date of Patent: Aug. 26, 2025

(54) THREE-DIMENSIONAL PRINTING ANTIMICROBIAL PRODUCTS

(71) Applicant: The Hong Kong Polytechnic University, Kowloon (HK)

(72) Inventors: Kwan Yu Lo, Kowloon (HK); Chi Wai Kan, Kowloon (HK)

(73) Assignee: The Hong Kong Polytechnic University, Hong Kong (CN)

( * ) Notice: Subject to any disclaimer, the term of this patent is extended or adjusted under 35 U.S.C. 154(b) by 110 days.

(21) Appl. No.: 18/040,907

(22) PCT Filed: Sep. 23, 2020

(86) PCT No.: PCT/CN2020/116961
§ 371 (c)(1),
(2) Date: Feb. 7, 2023

(87) PCT Pub. No.: WO2022/032817
PCT Pub. Date: Feb. 17, 2022

(65) Prior Publication Data
US 2023/0295445 A1    Sep. 21, 2023

(30) Foreign Application Priority Data

Aug. 13, 2020  (HK) .......................... 32020013837.0

(51) Int. Cl.
| | | |
|---|---|---|
| *B29C 64/124* | (2017.01) | |
| *B29C 64/10* | (2017.01) | |
| *B33Y 70/00* | (2020.01) | |
| *B33Y 70/10* | (2020.01) | |
| *C08K 5/00* | (2006.01) | |
| *C08L 55/02* | (2006.01) | |
| *C09D 7/65* | (2018.01) | |
| *B29K 55/02* | (2006.01) | |
| *B29K 105/00* | (2006.01) | |
| *B33Y 10/00* | (2015.01) | |

(52) U.S. Cl.
CPC ............ *B29C 64/124* (2017.08); *B29C 64/10* (2017.08); *B33Y 70/10* (2020.01); *C08K 5/0058* (2013.01); *C08L 55/02* (2013.01); *C09D 7/65* (2018.01); *B29K 2055/02* (2013.01); *B29K 2105/0035* (2013.01); *B33Y 10/00* (2014.12)

(58) Field of Classification Search
CPC .............................. B29C 64/10; B29C 64/124
See application file for complete search history.

(56) References Cited

U.S. PATENT DOCUMENTS

| 9,523,160 B2 | 12/2016 | Kim et al. | |
|---|---|---|---|
| 2015/0290280 A1 * | 10/2015 | Petrak ................. | A61K 9/0024 424/602 |
| 2019/0240938 A1 * | 8/2019 | von Blanckenhagen ................... | B29D 11/00865 |

FOREIGN PATENT DOCUMENTS

| CN | 1565195 A | 1/2005 | |
|---|---|---|---|
| CN | 104248776 A | 12/2014 | |
| CN | 107320342 A | 11/2017 | |
| CN | 107418130 A | 12/2017 | |
| CN | 108329437 A * | 7/2018 | ............. B33Y 70/00 |
| CN | 108822491 A | 11/2018 | |
| CN | 109705454 A | 5/2019 | |
| CN | 109846718 A | 6/2019 | |
| CN | 109939007 A | 6/2019 | |
| CN | 110787066 A | 2/2020 | |
| CN | 110791081 A | 2/2020 | |
| CN | 110872369 A | 3/2020 | |
| CN | 110917044 A | 3/2020 | |
| CN | 110951000 A | 4/2020 | |
| EP | 3273290 A1 * | 1/2018 | ........... B29C 64/112 |
| WO | 2016080573 A1 | 5/2016 | |
| WO | 2016182444 A1 | 11/2016 | |
| WO | 2018119026 A1 | 6/2018 | |
| WO | 2019175716 A1 | 9/2019 | |

OTHER PUBLICATIONS

Machine translation of CN 109939007 A, published Jun. 28, 2019.*
Yue, Jun et al., "3-D Printable Antimicrobial Composite Resins," Advanced Functional Materials, 25-43, p. 6756-6767, 2015.
Xianming, "3-D—Introduction to 3D Printing Technology", vol. 1, Oct. 31, 2019, p. 90-91.
Zuniga, Jorge M. et al., "Applications of antimicrobial 3D printing materials in space", Journal of 3D Printing in Medicine, 2019 Future Medicine Ltd., 3D Printing, vol. 3, No. 1.
Xinshen, Tong, "Basic Edition of Material Forming Process," vol. 2, p. 259-260, Aug. 31, 2019.
Gonzalez-Henriquez, Carmen Mabel et al., "Antimicrobial Polymers for Additive Manufacturing," International Journal of Molecular Sciences, Int. J. Mol. Sci 2019, 20, 1210.
Sa, Liu et al., "3D printing dental composite resins with sustaining antibacterial ability," Materials for life sciences, J. Mater Sci, 2019, 54:3309-3318.

(Continued)

*Primary Examiner* — Vickey Nerangis
(74) *Attorney, Agent, or Firm* — Scully, Scott, Murphy & Presser, P.C.

(57) ABSTRACT

A method of preparing antimicrobial 3D-printed material with antimicrobial agents integrated with the 3D-printed material. The 3D-printed material fabricated with the method of the present disclosure includes antimicrobial agent (s) fully integrated throughout the product and display antimicrobial effect throughout the product, which is resistant to daily wear and tear.

7 Claims, 5 Drawing Sheets

(56) References Cited

OTHER PUBLICATIONS

Fenglan X. et al., "Printing Aids", Chechen Pink et al., Beijing: Chemical Industry Press, 1st Edition, pp. 442-443 (Aug. 31, 2002), together with an English-language abstract (cited in CN OA).

Zhang L. et al., "Recent Advances in Medical Allergy", Tension Wave et al., 1st Edition, Beijing: Military Health Press, p. 132 (Dec. 31, 2015), together with an English-language abstract (cited in CN OA).

"Environment Engineering Materials", Ed. China. Railway Press, 1st Edition, p. 503 (Nov. 30, 2018), together with an English-language abstract (cited in CN OA).

Chinese Office Action dated May 20, 2023 received in Chinese Application No. 202080002667.9, together with an English-language translation.

\* cited by examiner

THREE-DIMENSIONAL PRINTING ANTIMICROBIAL PRODUCTS

FIELD OF THE INVENTION

The present invention relates to antimicrobial Three-Dimensional (3D) printing material and a method for preparing 3D printed products with antimicrobial activities.

BACKGROUND OF THE INVENTION

Infectious diseases can often be transmitted by ways including by respiratory droplets and contaminated surfaces. In the case of the COVID-19 pandemic, the Centers for Disease Control and Prevention (CDC) advises that people can contract COVID-19 by touching a surface or object that has the virus on it and then touching their own mouth, nose, or possibly their eyes. Therefore, efforts have been made in disinfecting surfaces that are shared amongst the public, in particular, in public areas of hotels and large housing estates seen in cities in Asia (e.g. Hong Kong), where thousands of people share the use of surfaces including the same door handles, button panels of elevators, etc. However, due to limited manpower for cleaning such high risk areas, there is a need for preparing surfaces with enhanced antimicrobial properties to limit skin contact contamination.

Antimicrobial technologies are often used in spray coating on various high contact public surfaces, but the provided antimicrobial effect could only last for at most 90 days with the currently available technology. As would be appreciated, as the surface wears away through repeated environmental/operational abrasion, the spray coating of antiviral agent often becomes inactive overtime. Furthermore, it is unclear to users when the coating spray loses its activity.

Various techniques have been tried to address these issues, one of which is Three-Dimensional (3D) printing and the use of materials, such as copper, which process intrinsic antimicrobial properties. However, copper is unsuitable for use as high contact public surfaces due to its weight and cost.

3D printing, or additive manufacturing, is an emerging technology for the construction of a three-dimensional object. A number of 3D printing techniques are available, including fused deposition modeling (FDM), stereolithography (SLA), and Digital Light Processing (DLP). The use of 3D printing technologies in preparing antimicrobial materials have been attempted.

U.S. Pat. No. 9,523,160B2 discloses an antimicrobial filament for 3D printing using Fused Deposition Modeling (FDM) process, which is the most widely adopted 3D printing for home users. FDM 3D printers build parts by melting and extruding thermoplastic filament, and provides a printer nozzle that deposits the melt filament layer by layer. It is known that FDM has the lowest resolution and the printed product include visible layer lines. Thus, 3D printed materials using this FDM technology have rough surfaces that are susceptible to the accumulation of dirt and growth of microbes.

Stereolithography (SLA) is another 3D printing approach which involves the use of a UV laser to cure liquid photopolymer resin into hardened plastic. This technique produces a very high resolution but the printing process can be long. The addition of antimicrobial agents to the liquid resin presents challenges due to the accumulation of antimicrobial agents at the bottom of the printing platform, causing uneven antimicrobial effect of the printed material.

Despite similarity between SLA and Digital Light Processing (DLP), liquid resins designed for SLA cannot be used between DLP and SLA in an interchangeable manner. This is because an SLA printer only uses a single beam of UV light to cure the liquid resin and stimulate polymerization, requiring the delivery of a much higher energy density compared to DLP. Thus, monomers designed for SLA printing require a higher energy for their bonds to open up and for the polymerization process to start.

Although the use of DLP approach in preparing antibacterial material for dental applications has been attempted (Sa, L., Kaiwu, L., Shenggui, C., Junzhong, Y., Yongguang, J., Lin, W., & Li, R. (2019). 3D printing dental composite resins with sustaining antibacterial ability. Journal of materials science, 54(4), 3309-3318), such methods require the use of silver nitrate/nanotechnology in high level nanotechnology laboratory and cannot be performed in regular 3D printing facilities. It is anticipated that such nanotechnology would require high manufacturing cost. Furthermore, to ensure safe use of nanoparticles in the production, users shall require a higher degree of safety precaution and thus adding extra costs to the application. As would be appreciate by those skilled in the art, the use of silver nitrate is undesirable due to its toxicity and corrosive property, well-known staining problem and potential carcinogenic effect.

It is an object of the present invention to address or at least ameliorate at least one of the deficiencies discussed above.

SUMMARY

Features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims.

In accordance with a first aspect of the present invention, there is provided a method of preparing antimicrobial 3D-printed material, comprising the steps of:
a) mixing an antimicrobial agent with a 3D printing resin;
b) transforming the combined solution through digital light processing in the 3D printer; and
c) printing the material.

Advantageously, 3D-printed material does not contain or is free of nanotubes.

Optionally, the antimicrobial agent is in liquid form, and preferably provided in 10% by weight of the resin. Alternatively, the antimicrobial agent is provided in solid form and preferably provided in 0.25-1% by weight of the resin.

In a preferred embodiment, the antimicrobial agent is selected from the group consisting of: polyhexamethylene biguanide (PHMB), chloroxylenol, cetylpyridinum chloride (CPC), cetrimonium bromide (CTAB), zinc oxide, silver oxide, titanium dioxide and combinations thereof.

Advantageous, the antimicrobial agent is Polyhexamethylene biguanide (PHMB), or zinc oxide, silver oxide, or titanium dioxide. More advantageously, the antimicrobial agent is a combination of Polyhexamethylene biguanide (PHMB) and zinc oxide.

In one embodiment, in a method of preparing antimicrobial 3D-printed material, the mixing step is performed using an ultrasonic mixer.

Optionally, a mixing agent is added during the mixing step. Such a mixing agent may be selected from the group consisting of alcohol and Dimethyl sulfoxide (DMSO). Advantageously, the mixing agent is 99% ethanol. The mixing agent may add in an amount in the ratio in a range of 1:1 to 1:5 of the antimicrobial agent, depends on the choice of 3D printing material.

In another embodiment, in a method of preparing antimicrobial 3D-printed material, the digital light processing is provided by a digital light projector.

Optionally, the resin is ABS based UV sensitive resin, which may be selected from the group consisting of EPIC, ABS-tough, TOUGH-GRY (e.g. TOUGH-GRY 10), E-PDXY, E-RIGID PU BLACK, E-RIGID PU NATURAL, E-RIGIT PU WHITE, E-SHORE A 40, E-SHORE A 80, LOCTITE 3D 5015 SILICONE E1 CLEAR, E-RIGID-FORM AMBER, ERIGIDFORM CHARCOAL, PREFACTORY HARZ D20 WHITE (ABS FLEX WHITE), ABS HI-IMPACT GRAY and ABS HI-IMPACT BLACK.

In accordance with a second aspect of the present invention, there is provided an antimicrobial 3D-printed material prepared according to the method described in the present disclosure. Preferably, the antimicrobial 3D-printed material is free of nanotubes.

BRIEF DESCRIPTION OF THE FIGURES

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings.

Preferred embodiments of the present invention will be explained in further detail below by way of examples and with reference to the accompanying figures, in which.

DETAILED DESCRIPTION OF THE PREFERRED EMBODIMENTS

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for 3D-printed products having antimicrobial activities, and methods for preparing the antimicrobial 3D-printed products.

Figure 1:
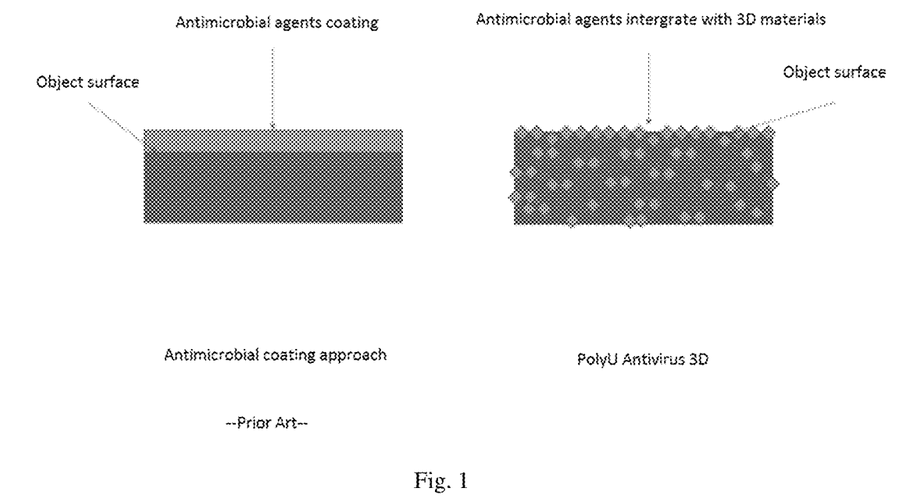
FIG. 1 depicts a schematic view of 3D-printed product according to an embodiment of the present disclosure (right) and schematic view of a product (left) that is coated with antimicrobial agents.
Figure 2:
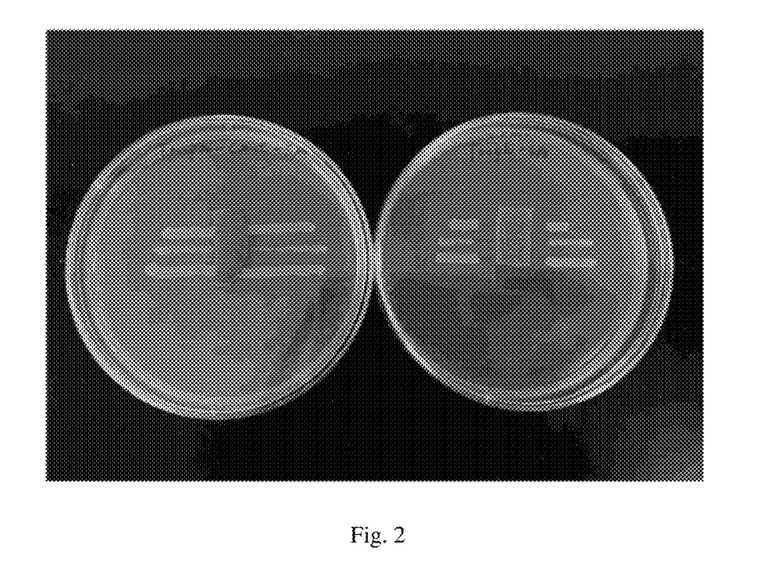
FIG. 2 depicts the antibacterial effect of Tough-Gry resins produced in accordance with the present disclosure (right) and the control sample (left) against S. aureus.

Referring to the figures, FIG. 1 schematically depicts a 3D-printed product with antimicrobial agents integrated with the 3D-printed material (right hand side) in comparison with a product (left hand side) that is coated with antimicrobial agents. As shown, using the traditional coating method, it is expected only the surface of the treated object would display antimicrobial activity, and such activity is easily lost over time due to wear and tear from daily use. By contrast, according to the present invention, the antimicrobial agent(s) is/are fully integrated throughout the product and the antimicrobial effect is exhibited throughout.

In one embodiment, there is provided a method of preparing antimicrobial 3D-printed material, comprising the steps of:

1. mixing an antimicrobial agent with a 3D printing resin
2. transforming the combined solution through digital light processing in the 3D printer; and
3. printing the material.

In an embodiment, the 3D-printed material is free of nanotubes and/or silver nitrate.

In an embodiment, the antimicrobial agent is in liquid form and provided in 10% by weight of the resin.

In an embodiment, the antimicrobial agent is in solid form and provided in 0.25-1% by weight of the resin.

The antimicrobial agent is a chemical antimicrobial agent that is positively charged as they are particularly suited for killing viruses, as virus shells are negatively charged. Examples of positively charged chemical antimicrobial agents include: Polyhexamethylene biguanide (PHMB), Chloroxylenol, Cetylpyridinum Chloride (CPC), Cetrimonium Bromide (CTAB), Zinc Oxide, Silver Oxide, Titanium dioxide and combinations thereof.

The antimicrobial agent is transparent such that the agent does not deflect or block light required for DLP 3D printing.

In an embodiment, the antimicrobial agent is Polyhexamethylene biguanide (PHMB), which may be provided as a solution or in solid form.

In an embodiment, the antimicrobial agent is zinc oxide, silver oxide, or titanium dioxide.

In an embodiment, the antimicrobial agent is a combination of Polyhexamethylene biguanide (PHMB) and zinc oxide.

Optionally, mixing is performed using an ultrasonic mixer.

In an embodiment, a mixing agent is added to further improve the mixing quality or increase the antimicrobial activity of the 3D printed product. Exemplary mixing agents include alcohol, such as, ethanol, or Dimethyl sulfoxide (DMSO). Preferably, the mixing agent is added in an amount in the ratio of 1:1 of the antimicrobial agent.

In an embodiment, the mixing agent is 99% ethanol.

In an embodiment, digital light processing is provided by a digital light projector, and the light beam projected by the digital light projector is reflected by a digital micromirror device (DMD).

In an embodiment, the resin is ABS based UV sensitive resin, e.g. EPIC, ABS-tough, TOUGH-GRY (e.g. TOUGH-GRY 10), E-PDXY, E-RIGID PU BLACK, E-RIGID PU NATURAL, E-RIGIT PU WHITE, E-SHORE A 40, E-SHORE A 80, LOCTITE 3D 5015 SILICONE E1 CLEAR, E-RIGIDFORM AMBER, ERIGIDFORM CHARCOAL, PREFACTORY HARZ D20 WHITE (ABS FLEX WHITE), ABS HI-IMPACT GRAY, ABS HI-IMPACT BLACK, and the resin is placed in the vat of the 3D printer.

In an embodiment, the 3D printed material displays antiviral and antibacterial activities for at least 90 days, preferably at least 180 days, and more preferably at least 250 days. A number of technical problems have been solved by the method of the present disclosure:

- Method of the present disclosures allows users to prepare products with the desired antimicrobial agents in a flexible manner, as the chemical formulation, ingredients and resins can be easily adjusted.
- The use of DLP technique in 3D printing allows the manufacturing of products in an efficient and cost-effective manner, since the method does not require complex and costly nanotechnology. Further, as compared to SLA 3D printing, DLP achieves quicker print times as the DLP printer exposes entire layers at once.
- The 3D printed material provides a clear indication to users of the antimicrobial activity of the surfaces, giving comfort to users at the time of pandemic. This is in contrast to traditional antimicrobial coating, as users have no way of knowing whether the area is disinfected at a certain time, due to the loss of activity after treatment over time.
- Also, as compared to products with surfaced treated with antimicrobial agents, the core of the 3D-printed materials is expected to exhibit antibacterial and antiviral activities, providing consistent antimicrobial effect even as the object surface progressively wears or is scratched off, which is a common problem seen in products with high usage by the general public.
- The method can be used to print handles (e.g., toilet door, exit doors, and recycling boxes) or covers in public areas to avoid contamination. It is expected that the products printed from the 3D printer according to the method of the present disclosure have antibacterial and antivirus features throughout its life cycle. In particular, it is envisaged that the method of the present disclosures can significantly reduce the chance of contact contamination by providing 3D printed door handles and covers that could inactivate virus and bacteria with a corresponding low level of maintenance required.
- Apart from the reduction of the risk of disease transmission in public area, the 3D printed material prepared by the method of the present disclosure is particularly suited for medical use, as well as the rehabilitation area, such as the devices to assist patient's mobility, such as walking devices or assistive tools for wheelchairs. Those devices are often needed to be customized and antimicrobial feature would further prevent patients from illnesses.

EXAMPLES

Example 1: Parallel Streak Test

Tests for two 3D printing materials were conducted to determine the inhibitory effect of a 3D printed material prepared using the method of the present disclosure. Two bacteria—*Staphylococcus aureus* (*S. aureus*) (Gram positive) and *Klebsiella pneumoniae* (*K. pneumoniae*) (Gram negative)—commonly found in the environment are being tested.

The testing of antibacterial effect is based on to modified method of AATCC Test Method 147, which is also known as the Parallel Streak test. This method is useful for obtaining a rough estimate of activity in that the growth of the inoculum organism decreases from one end of each streak to the other and from one streak to the next resulting in increasing degrees of sensitivity. The size of the zone of inhibition and the narrowing of the streaks caused by the presence of the antibacterial agent permit an estimate of the residual antibacterial activity after multiple washings (AATCC).

In this test, ABS based UV sensitive resins were selected and mixed with two exemplary antimicrobial agents (e.g., 10% by weight of Polyhexamethylene biguanide, and 0.25% by weight of zinc oxide) as shown in the Table 1 below.

The antimicrobial agent was first mixed with 3D printing resin to form a modified resin, and subsequently an ultrasonic mixer was used to remove bubbles from the mixture. The combined solution was then transformed through the digital lighting processing in the 3D printing machine. Details of the 3D printing method and re-hardening process are as summarized below.

TABLE 1

| | Resin | Amount | UV | Ultrasonic mixing | Re-hardening Process |
|---|---|---|---|---|---|
| Polyhexamethylene biguanide | Envision TEC HTM140V2 | 10% of net weight of the resin | Brightness 700 mw/dm$^2$ | Frequency 22 KHz, heating power 250 W, ultrasonic power 140 W | Otoflash G171 2X 2000 flashes |
| | ToughGry - 10 | 10% of net weight of the resin | Brightness 700 mw/dm$^2$ | Frequency 22 KHz, heating power 250 W, ultrasonic power 140 W | Otoflash G171 2X 2000 flashes |

TABLE 1-continued

|  | Resin | Amount | UV | Ultrasonic mixing | Re-hardening Process |
|---|---|---|---|---|---|
|  | EPIC | 10% of net weight of the resin | Brightness 700 mw/dm$^2$ | Frequency 22 KHz, heating power 250 W, ultrasonic power 140 W | Otoflash G171 2X 2000 flashes |
| Zinc Oxide | Envision TEC HTM140V2 | 0.25% of net weight of resin | Brightness 700 mw/dm$^2$ | Frequency 22 KHz, heating power 250 W, ultrasonic power 140 W | Otoflash G171 2X 2000 flashes |
|  | Envision TEC HTM140V2 | 0.5% of net weight of resin | Brightness 700 mw/dm$^2$ | Frequency 22 KHz, heating power 250 W, ultrasonic power 140 W | Otoflash G171 2X 2000 flashes |

Figure 3:
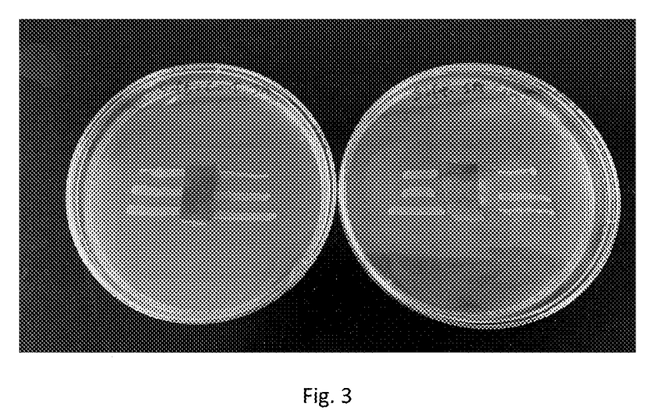
FIG. 3 depicts the antibacterial effect of EPIC resins produced in accordance with the present disclosure (right) and the control sample (left) against S. aureus.
Figure 4:
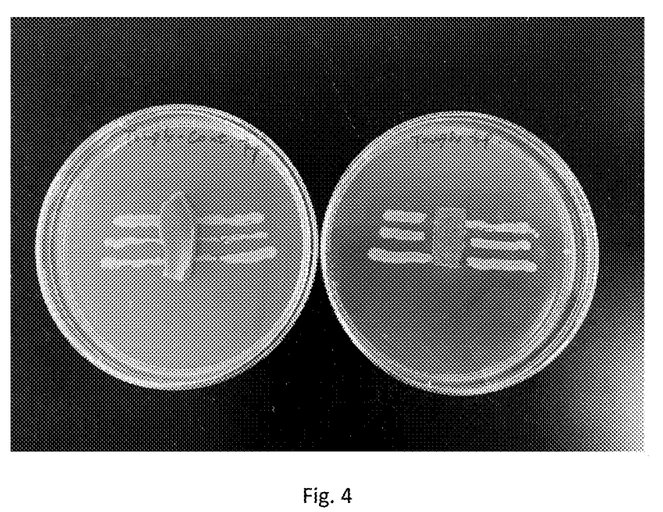
FIG. 4 depicts the antibacterial effect of Tough-Gry resins produced in accordance with the present disclosure (right) and the control sample (left) against K. pneumoniae.
Figure 5:
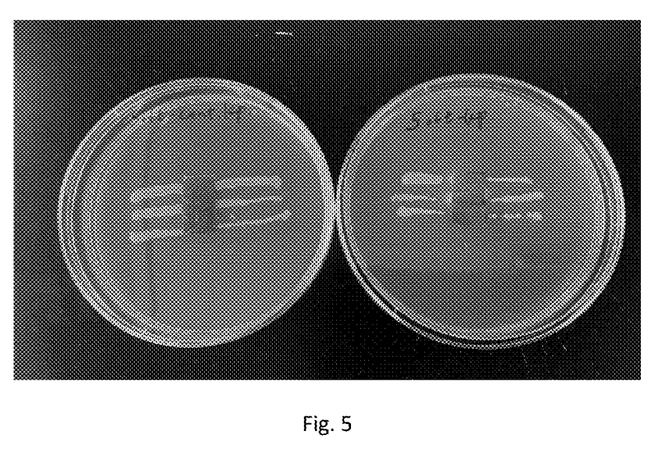
FIG. 5 depicts the antibacterial effect of EPIC resins produced in accordance with the present disclosure (right) and the control sample (left) against K. pneumoniae.
Figure 6:
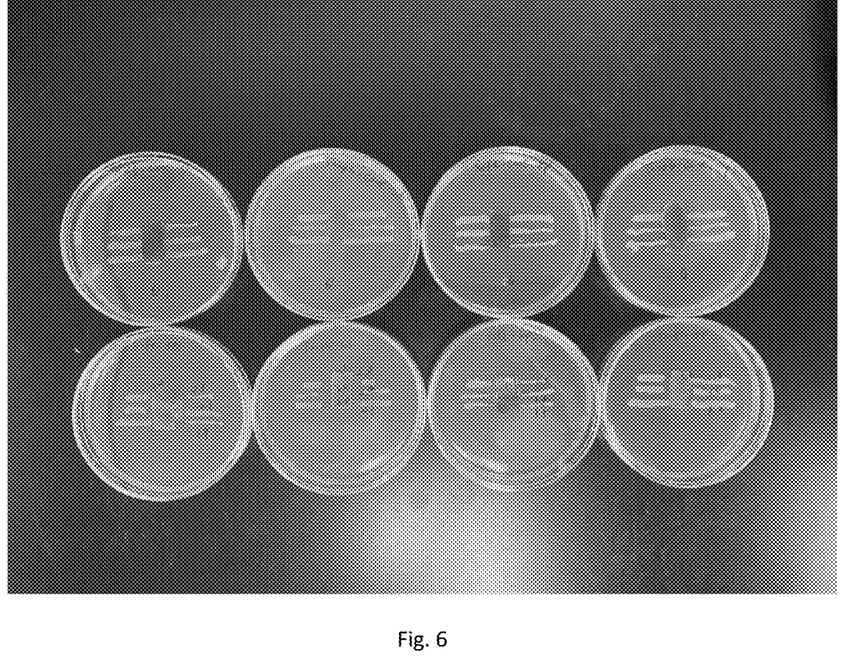
FIG. 6 depicts the test results of resins integrated with PHMB solution, with the top row being the control samples and the bottom row being the treatment samples.
Figure 7:
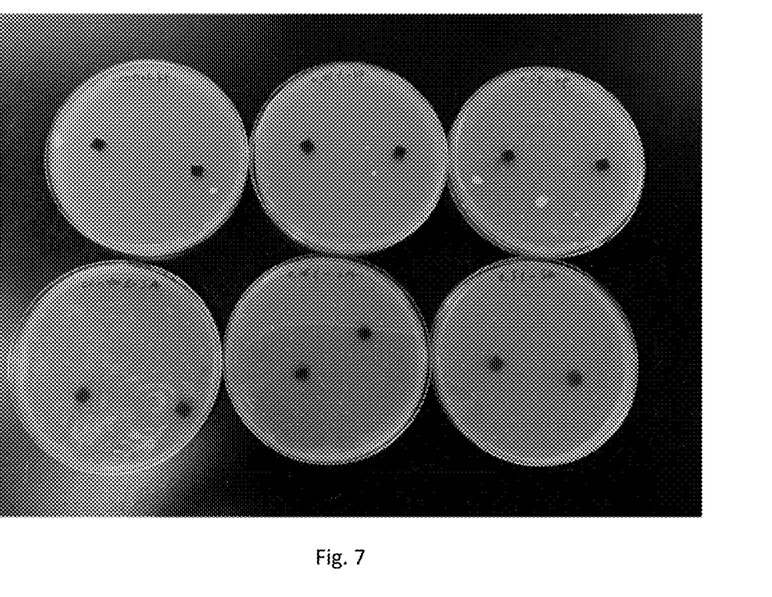
FIG. 7 depicts the test results of resins integrated with zinc oxide, with the dishes on the left column being the control samples and the middle and right columns being the treatment samples.

The results of the parallel streak test are provided in FIGS. 2-6, in which it is clearly shown that the 3D printed materials as prepared by the method of the present disclosure show significant antibacterial effect, inhibiting the growth of *Staphylococcus aureus* (FIGS. 2 and 3) and *Klebsiella pneumoniae* (FIGS. 3 and 4). Clear inhibition zones were observed, in particular for 3D-printed material infused with PHMB. With regard to samples obtained from zinc oxide modified resin, the antibacterial effect is observed for Gram positive bacteria. Individual inhibition width of the treated 3D printed samples are summarized in Table 2 below.

TABLE 2

|  | Test 1 | | | Test 2 | | |
|---|---|---|---|---|---|---|
|  | Control | 10% weight of PHMB with EPIC | 10% weight of PHMB With Tough Gry | Control | 0.25% weight Zinc oxide With HTM | 0.5% weight Zinc oxide with HTM |
| *Klebsiella pneumoniae* | No inhibition zone | 2.3 mm | 1.8 mm | No inhibition zone | No inhibition zone | No inhibition zone |
| *Staphylococcus aureus* | No inhibition zone | 4.2 mm | 6 mm | No inhibition zone | Slight inhibition zone | Slight inhibition zone |

Example 2: Surface Abrade Test

A surface abrade test was performed to determine the antimicrobial activity of the internal part of the 3D-printed product. PHMB (10% by weight) and Zinc Oxide (2.5% by weight) was added to HTM 140 resin, and printed by the method of the present disclosure using DLP technology, and the surface of the printed material was scratched away using a cutter before subjecting the samples to the modified AATCC Test Method 147 as described above. The abraded surface was placed downward (touching the petri dish).

After culturing *Klebsiella pneumoniae* with the sample, an inhibition width of 0.067 was observed, demonstrating the antimicrobial effect of the inner portion of the 3D-printed material on *Klebsiella pneumoniae*.

Example 3: Parallel Streak Test of Samples Formed with Mixing Agent

Experiment was repeated using ABS-tough, which is another 3D printing resin that has some inherent basic antibacterial function. The resin was mixed with significantly smaller amount of water base PHMB (1% of net weight).

Instead of using an ultrasonic mixer, alcohol was as the mixing agent to improve the quality of the mixing. The modified AATCC Test Method 147 was repeated and the results show that the 3D-printed samples display stronger antibacterial effects *Staphylococcus aureus*, while all samples do not allow bacterial to grow over the samples. This is an indication of effective antibacterial function of the surface of the sample.

Figure 8:
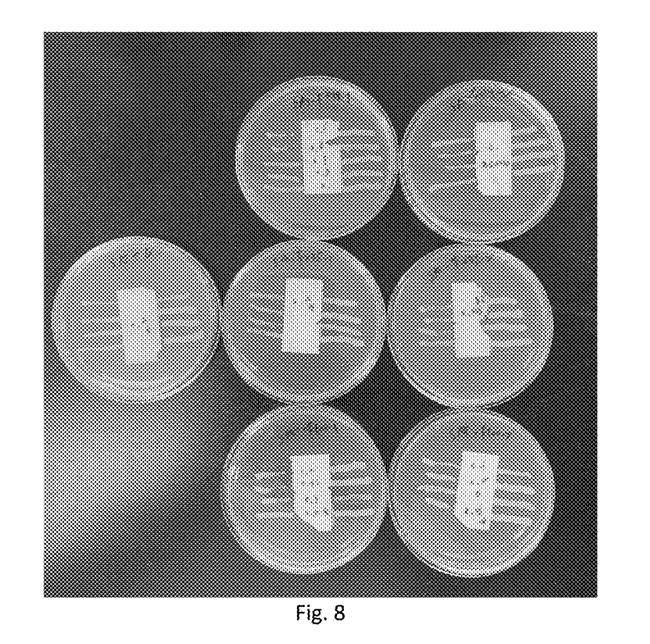
FIG. 8 depicts the test results of 3D-printed materials integrated with PHMB solution cultured with S. aureus under different experimental conditions.
Figure 9:
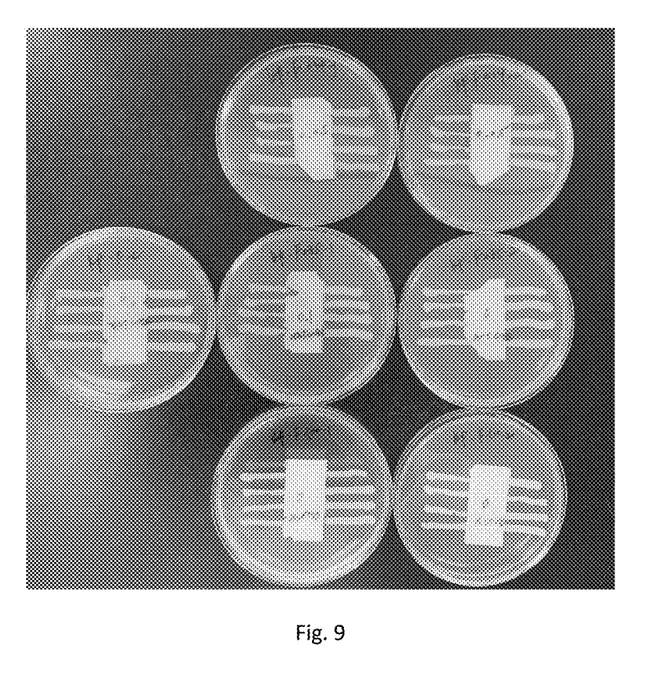
FIG. 9 depicts the test results of 3D-printed materials integrated with PHMB solution cultured with K. pneumoniae under different experimental conditions.

FIGS. 8 and 9 demonstrates the activity of 3D-printed sample materials prepared with resins integrated with different amount of PHMB together with 99% ethanol in a 1:1 ratio, with and without abrading the surface before testing. FIG. 8 depicts the dishes cultured with *S. aureus* whereas FIG. 9 depicts the dishes cultured with *K. pneumoniae*. Inhibition width was measured and the observations are summarized in Table 3 below.

TABLE 3

| Sample | Sample Information | Scrape | SA Inhibition Width (mm) | KP Inhibition Width (mm) |
|---|---|---|---|---|
| F Control | No treatment |  | 0.25 | 0, no bacteria crossing |
| F014-1 | 0.14% wt, 1600 mg/l | N | 1.7 | 0.06 |
| F014-2 | 1:1 ethanol | Y | 0, no bacteria crossing | 0.06 |
| F035-1 | 0.35% wt | N | 0.25 | 0.13 |

TABLE 3-continued

| Sample | Sample Information | Scrape | SA Inhibition Width (mm) | KP Inhibition Width (mm) |
|---|---|---|---|---|
| F035-2 | 1:1 ethanol | Y | 0.06 | 0, no bacteria crossing |
| F100-1 | 1.00% wt | N | 1.69 | 0, no bacteria crossing |
| F100-2 | 1:1 ethanol | Y | 0.69 | 0, no bacteria crossing |

Based on the result of the control sample, it is observed that the plastic itself exhibits some antibacterial activity, potentially due to the residue of alcohol at the printing base after the printing out the treatment samples. Additionally, it is observed that non-scraped samples have better antibacterial activity than scraped samples, and the antibacterial effect on S. aureus is significantly improved by the use of alcohol as a mixing agent.

Example 4: Parallel Streak Test of Samples Formed with Mixing Agent and Powder Form of PHMB Example 3 was repeated with samples prepared with PHMB powder instead of PHMB solution, with all the other parameters remain the same. The results are shown in Table 4 below and also in FIG. 10, with the upper dishes cultured with S. aureus and the lower dishes cultured with K. pneumoniae.

Figure 10:
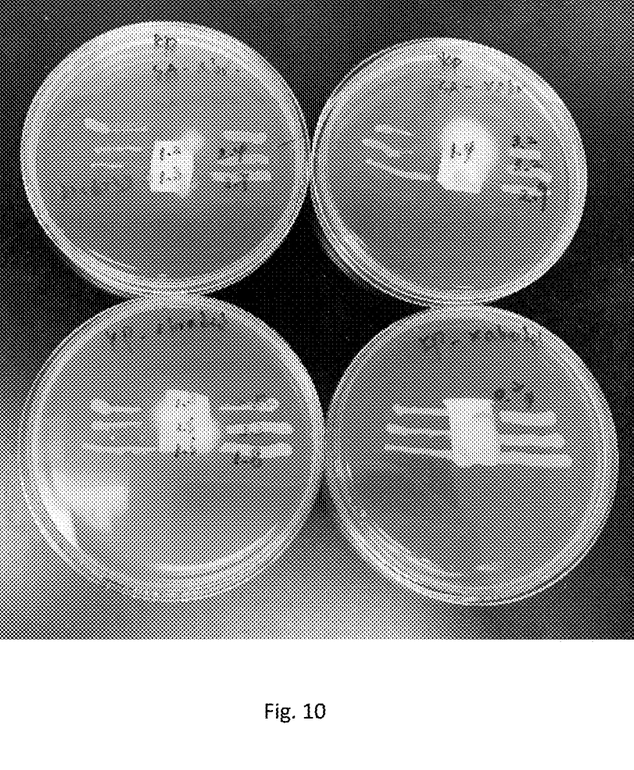
FIG. 10 depicts the test results of 3D-printed materials integrated with PHMB powder cultured with S. aureus and K. pneumoniae under different experimental conditions.

As compared to the test result of Example 3, the abraded samples (as shown in the left photos) are found to display stronger inhibition effect than the samples prepared with PHMB solution. It shows that the PHMB powder mixed inside the material is able to provide an enhanced effect to the cracked surface. Such results are favourable to the public application, when the product surfaces could be easily scratched by thousands of users' nails, keys, and other tools. The inhibition effects will remain strong despite normal wear.

TABLE 4

| Sample | SA Inhibition Width (mm) | KP Inhibition Width (mm) |
|---|---|---|
| ABS Tough PHMB Powder 0.3% wt, abraded | 6.5 | 8.5 |
| ABS Tough PHMB Powder 0.3% wt, not abraded | 3.8 | 0.3 |

These experimental result confirm that the 3D printing method of the present disclosure allows full integration of antimicrobial function of an antimicrobial agent into the 3D printing materials, allowing the provision of antimicrobial function in a more long-lasting manner as compared to other techniques involving spray coating the surface of the product. As would be expected by those skilled in the art, since the antimicrobial agent is fully integrated into the product, the antimicrobial effect would remain despite "wear and tear" due to daily usage. Therefore, the uncertainty of ineffectiveness can be minimized. Table 4 below provide a comparison of the antimicrobial approaches in public area with high frequency skin contacts, further supporting the advantageous of the method of the present disclosure.

TABLE 5

| | Cleaning with disinfection agents | Antimicrobial coating spray | Printed Product |
|---|---|---|---|
| Effectiveness continuity | Until next contacts of virus | 90 days (or until the surface is worn off) | Whole product life cycle (years) |
| Effectiveness | Good | High | High |
| Clear indication of anti-microbial effect | Uncertain | Uncertain | Certain |
| Chances of contamination to cleaner | High | Low | Low |
| Mass customization | Nil | Yes | Yes |
| Cost | Low | Moderate | High |
| Maintenance effort | High | Medium | Low |

The above embodiments are described by way of example only. Many variations are possible without departing from the scope of the invention as defined in the appended claims. Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A method of preparing antimicrobial 3D-printed material, comprising the steps of:
   a) mixing an antimicrobial agent with a 3D printing resin to form a mixture;
   b) transforming the mixture through digital light processing in a 3D printer; and
   c) printing the material;
   wherein the antimicrobial agent comprises solid polyhexamethylene biguanide (PHMB);
   wherein a mixing agent is added during the mixing step;
   wherein the mixing agent is 99% ethanol, the mixing agent is added in an amount in the weight ratio of 1:1 of the antimicrobial agent, and the antimicrobial agent is provided in 0.25-1% by weight of the resin; and
   wherein the resin is ABS based UV sensitive resin.

2. The method according to claim 1, wherein the 3D-printed material does not contain nanotubes.

3. The method according to claim 1, wherein the antimicrobial agent further comprises chloroxylenol, cetylpyridinum chloride (CPC), cetrimonium bromide (CTAB), zinc oxide, silver oxide, titanium dioxide or a combination thereof.

4. The method according to claim 1, wherein the antimicrobial agent further comprises zinc oxide, silver oxide, or titanium dioxide.

5. The method according to claim 1, wherein the antimicrobial agent is a combination of solid polyhexamethylene biguanide (PHMB) and zinc oxide.

6. The method according to claim 1, the mixing step is performed using an ultrasonic mixer.

7. The method according to claim 1, wherein the digital light processing is provided by a digital light projector.

* * * * *